Jan. 9, 1923.
J. ECKHARD.
DRILL PRESS.
FILED DEC. 13, 1920.
1,441,668.
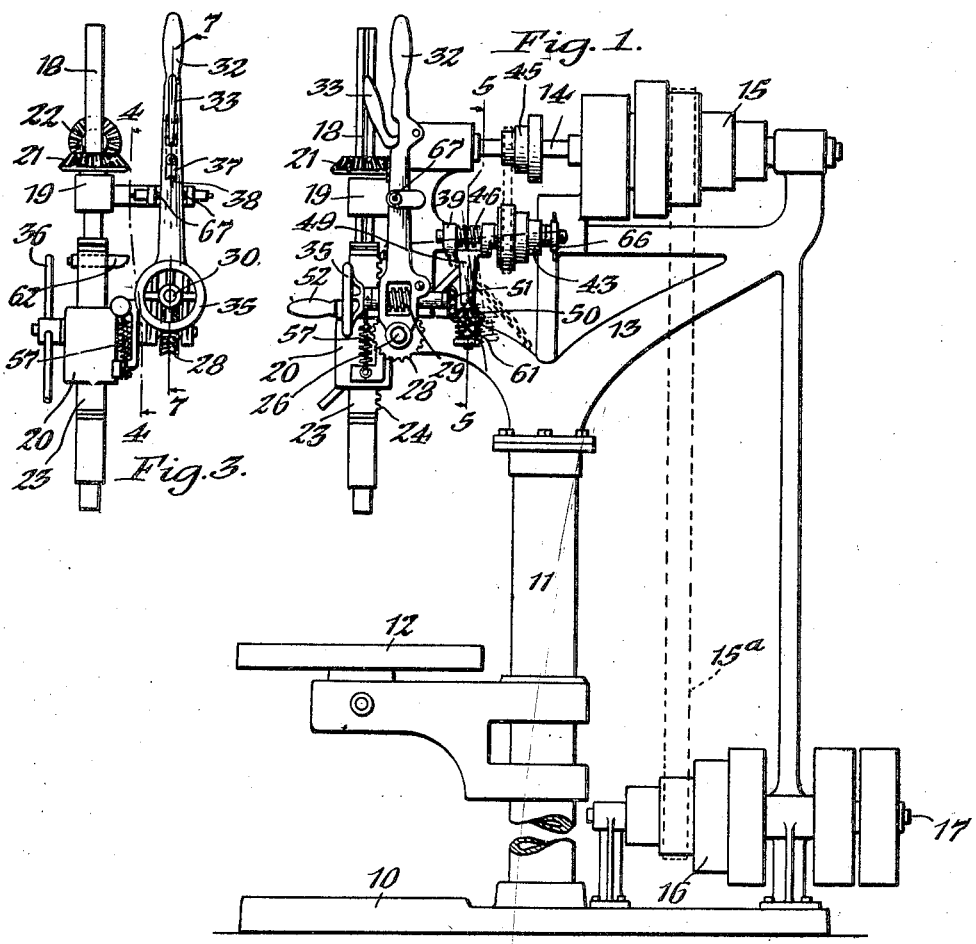
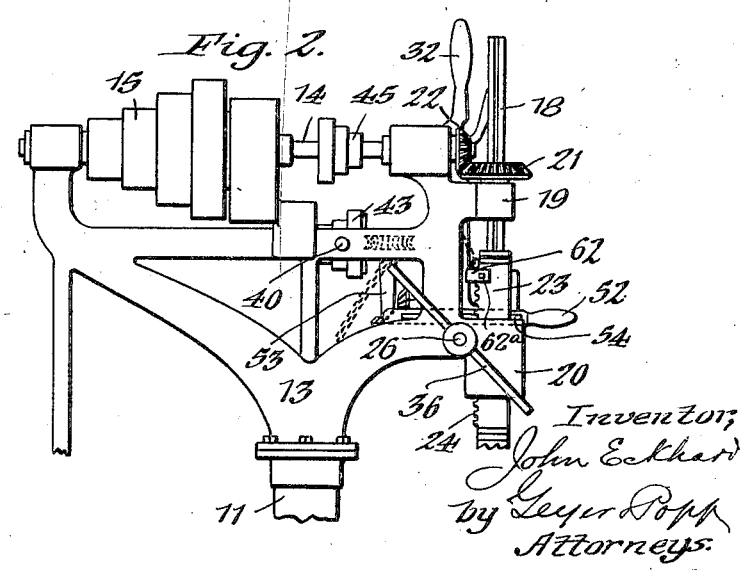

Jan. 9, 1923. 1,441,668.
J. ECKHARD.
DRILL PRESS.
FILED DEC. 13, 1920. 2 SHEETS—SHEET 2.
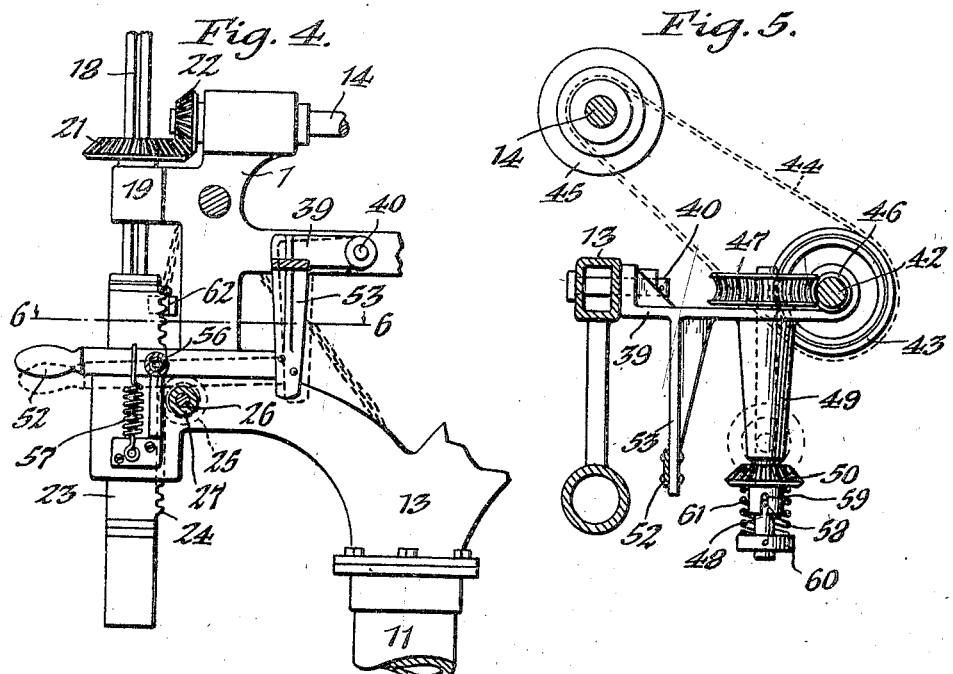
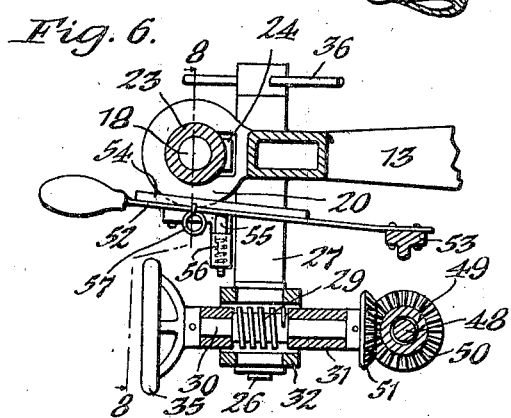
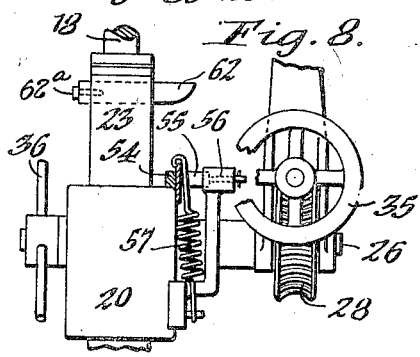
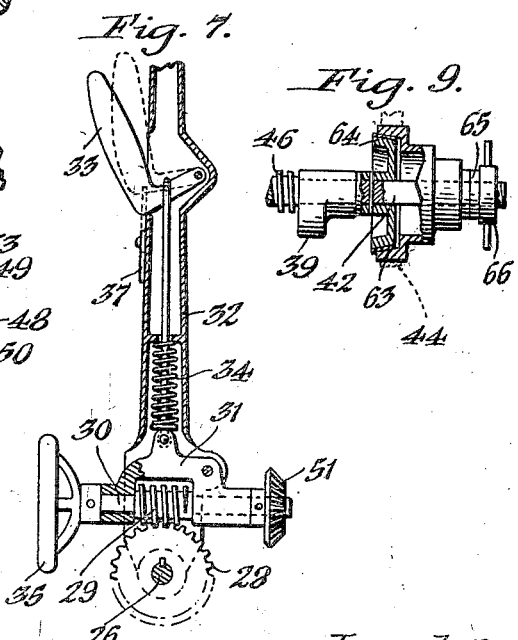

Patented Jan. 9, 1923.

1,441,668

UNITED STATES PATENT OFFICE.

JOHN ECKHARD, OF BUFFALO, NEW YORK, ASSIGNOR TO FRONTIER MACHINE TOOL COMPANY, INC., OF BUFFALO, NEW YORK, A CORPORATION OF NEW YORK.

DRILL PRESS.

Application filed December 13, 1920. Serial No. 430,111.

*To all whom it may concern:*

Be it known that I, JOHN ECKHARD, a citizen of the United States, residing at Buffalo, in the county of Erie and State of New York, have invented new and useful Improvements in Drill Presses, of which the following is a specification.

This invention relates to a drill press and has for its principal object the provision of an improved machine which is universal in character, being manually operable for light and delicate work, and power actuated for heavy and fast work.

Further objects of the invention are to provide an improved automatic stop device for disengaging the power feed mechanism when a hole has been drilled to its proper depth, and to improve the machine in other respects, as will hereinafter appear.

In the accompanying drawings: Figure 1 is an elevation of one side of a drill press embodying my improvements. Figure 2 is a fragmentary elevation of the opposite side thereof. Figure 3 is a fragmentary front view of the press. Figure 4 is an enlarged vertical section on line 4—4, Fig. 3. Figure 5 is an enlarged vertical section on line 5—5, Fig. 1. Figure 6 is an enlarged horizontal section on line 6—6, Fig. 4. Figure 7 is an enlarged vertical section on line 7—7, Fig. 3. Figure 8 is a vertical transverse section on line 8—8, Fig. 6. Figure 9 is a sectional elevation of the feed governing clutch.

Similar characters of reference indicate corresponding parts throughout the several views.

In its general organization, the drill press comprises a base 10, a column 11 rising from the base, a supporting table 12 for the work piece, and an upper frame 13 suitably secured to said column and carrying the operative mechanism of the drill.

Journaled in the upper end of the frame is a horizontal driving shaft 14 having a cone pulley 15 driven by a belt 15ª from a lower cone pulley 16 mounted on a horizontal shaft 17 driven from any suitable source of power. A vertical drill spindle 18 is journaled in upper and lower bearings 19 and 20 and splined on said spindle is a bevel gear 21 meshing with a similar gear 22 mounted on the driving shaft 14. The sleeve or quill 23 of this spindle is provided with the usual rack 24 which meshes with a pinion 25 mounted on a transverse shaft 26 supported in a bearing 27 carried by the frame. Mounted on one end of this shaft is a worm wheel 28 with which a worm 29 is adapted to mesh. The latter is carried by a shaft 30 journaled in a yoke 31 mounted for vertical oscillatory movement in the lower bifurcated end of the customary heavy-duty lever 32 which is secured to the transverse shaft 26. To this yoke is operatively connected the usual thumbpiece or elbow lever 33 by means of which the worm 29 may be disengaged from its worm wheel, said worm being normally held in engagement with said worm wheel by a spring 34. In actuating the heavy-duty lever 32 to rotate the shaft 26 and thereby impart a vertical movement to the drill spindle, the worm 29 acts as a pawl or dog for operatively connecting said lever with the worm wheel. The customary hand wheel 35 is connected to said worm for rotating it to raise and lower the drill spindle.

A lever 36 is secured to the other end of the shaft 26 for actuating the drill spindle by hand where sensitiveness is required, as in light and delicate work. Under such conditions, it is necessary to disengage the worm 29 from the worm wheel 28 to permit free rotation of the shaft 26. In order to positively hold said worm in such position without the necessity of being so held by the operator, a suitable retaining catch or arm 37 is employed. This catch is pivoted to the adjacent portion of the lever 32 and provided in its free end with an arcuate seat or notch 38 upon which the lower portion of the thumb piece 33 is adapted to rest, as shown by dotted lines in Fig. 7. When not in use, this catch hangs in a pendant position, shown by full lines in Fig. 3.

The means for actuating the feed of the drill by power are preferably constructed as follows:

39 indicates a vertically swinging frame or carrier pivoted at 40 to the upper main frame structure of the drill press. Journaled in this oscillating frame is a horizontal shaft 42 on the rear end of which is mounted a cone pulley 43 operatively connected by a belt 44 with a similar cone pulley 45 mounted on the driving shaft 14. The front end of said shaft 42 carries a worm 46 meshing with a worm wheel 47 secured to the upper end of a vertical shaft 48 journaled in a bearing 49 depending from the frame 39. Yieldingly mounted on the lower end of said vertical shaft is a bevel gear 50 adapted to be moved into and out of engagement with a corresponding gear 51 mounted on the rear end of the worm shaft 30, as shown in Figs. 5 and 6. Thus, the power feed for the drill spindle is obtained through the cone pulley 45, belt 44, cone pulley 43, worm 46, worm wheel 47, bevel gears 50 and 51, worm 29, worm wheel 28, pinion 25 and spindle rack 24.

By rocking the oscillating frame 39 downwardly and rearwardly, the gear 50 is moved out of engagement with the corresponding gear 51. For this purpose, a laterally-flexible actuating lever or handle 52, preferably constructed of spring steel, is fixed at its inner end to a depending arm 53 formed integrally with said frame 39. This actuating lever is provided on one side thereof with a laterally-projecting rib or shoulder 54, which, in the normal operative position of said lever, engages the adjacent upper face of the lower spindle bearing 20 as shown in Figs. 6 and 8. A horizontally-disposed spring pressed pin or plunger 55 guided in a bracket 56 tends to hold the shoulder of the lever 52 in engagement with the face of said bearing. A vertically arranged coil spring 57 tends constantly to move said actuating lever downwardly to rock the frame 39 rearwardly and move the gear 50 out of engagement with the gear 51. By this construction, said frame is firmly held in place and looseness of the parts carried thereby is prevented.

Should the gears 50 and 51 fail to mesh properly in shifting them into engagement with each other, their teeth would ordinarily be damaged or broken and the shaft 48 would be liable to bend. To avoid this, the gear 50 is slidably mounted on its shaft and capable of yielding downwardly thereon. To this end, as shown in Fig. 5, the shaft 48 is provided with a pin 58 which engages a longitudinal slot 59 in the hub of the gear 50, and interposed between the latter and a collar 60 fixed to said shaft is a coil spring 61 which allows said gear to yield more or less when shifted into operative engagement with the gear 51.

Means are provided for automatically disengaging the power feed mechanism after a hole has been drilled to its proper depth in a piece of work, and as shown in the drawings, these means preferably consisting of a tappet or cam bar 62 mounted for vertical adjustment on the quill 23 of the drill spindle and held in a set position by a screw or bolt 62ª. As shown clearly in Fig. 8, this tappet projects laterally from said quill, being arranged in the path or plane of the actuating handle 52 so as to shift the latter laterally from engagement with the face of the bearing 20, when the required depth of hole has been drilled.

Upon being so shifted, the spring 61 pulls the handle 52 downwardly, moving the oscillatory frame 39 rearwardly and disconnecting the power feed mechanism from the drill. In this position, the actuating handle rests on the upper side of the adjacent shaft bearing 27, as shown by dotted lines in Fig. 4.

To stop the power-feed of the drill spindle should the drill become dull and prevent breakage of the latter, a feed governing clutch is provided on the pulley shaft 42 which permits slippage between the companion clutch members under such conditions. As shown in Fig. 9 of the drawings, this clutch mechanism preferably comprises a female clutch member 63, formed integrally with the cone pulley 43 and loosely mounted on the shaft 42, and a male clutch member 64 pinned or otherwise secured to said shaft and in constant frictional engagement with said female clutch member. One of these clutch-members say the male member preferably has a facing of leather or other suitable material. The rear face of the cone pulley abuts against a thrust bearing 65 adjustably mounted on the pulley shaft 43.

By this construction, should a drill become dull while in use and its condition be unknown to the operator, the downward feed of the drill will cease, thereby informing the operator of the trouble and enabling him to stop the further operation of the machine before any damage is done.

An adjusting nut 66 is provided for regulating the frictional resistance of the clutch members, the nut being applied to the threaded end of the shaft 42 and engaging the bearing 65. The clutch is adjusted to resist normal torque, but allow slippage under the abnormal torque produced by a dull drill. By means of this nut, the resistance of the clutch can also be adjusted to suit different kinds of work, and so as to prevent breakage of the drills, particularly small drills.

In order to hold the heavy-duty lever 32 positively and reliably in its normal vertical position and prevent the same from accidentally dropping onto the head of the operator, two opposing spring-pressed pins or catches 67 are provided which are adapted to frictionally engage opposite sides of said lever.

I claim as my invention:

1. In a drill press, the combination of a drill spindle, feed mechanism for said spindle, a vertically-swinging frame carrying a power-transmitting gear adapted to move into and out of engagement with said feed mechanism, an actuating arm connected to said frame for rocking it, said arm being laterally movable relatively to said frame and arranged to interlock with a fixed part of the drill press to hold said frame in its operative position, and a spring tending to depress said arm for moving said frame to its inoperative position when released.

2. In a drill press, the combination of a drill spindle and its bearing, feed mechanism for said spindle, a vertically-swinging frame carrying a power transmitting gear adapted to move into and out of engagement with said feed mechanism, and an actuating arm secured to said frame, said arm being laterally flexible and arranged to engage said spindle-bearing for holding said frame in its operative position.

3. In a drill press, the combination of a drill spindle and its bearing, feed mechanism for said spindle, a vertically-swinging frame carrying a power transmitting gear adapted to move into and out of engagement with said feed mechanism, and an actuating arm secured to said frame, said arm being laterally flexible and having a shoulder arranged to engage the top of said spindle-bearing, and means for retaining said arm in engagement with said bearing.

4. In a drill press, the combination of a drill spindle and its bearing, feed mechanism for said spindle, a vertically-swinging frame carrying a power transmitting gear adapted to move into and out of engagement with said feed mechanism, and an actuating arm secured to said frame, said arm being laterally flexible and having a rib arranged to engage the top of said spindle bearing, a spring bolt tending to hold said arm in engagement with said bearing, and a spring tending to depress said arm for moving said frame to inoperative position when released.

5. In a drill press, the combination of a drill spindle, feed mechanism for said spindle, a movable frame, a driven shaft journaled in said frame, a power-transmitting member yieldingly mounted on said shaft to move lengthwise thereof and adapted to engage said feed mechanism, and means for actuating said frame to move said transmitting member into and out of engagement with said feed mechanism, without disturbing the yielding mounting of said transmitting member.

JOHN ECKHARD.